(12) United States Patent
Tihanyi et al.

(10) Patent No.: US 11,400,861 B2
(45) Date of Patent: Aug. 2, 2022

(54) CAMERA MONITORING SYSTEM

(71) Applicant: Knorr-Bremse Systeme fuer Nutzfahrzeuge GmbH, Munich (DE)

(72) Inventors: Viktor Tihanyi, Budapest (HU); Huba Nemeth, Budapest (HU); Levente Balogh, Szigetszentmiklos (HU); Adam Szoellosi, Budapest (HU); Balazs Gal, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/266,299

(22) PCT Filed: Jul. 18, 2019

(86) PCT No.: PCT/EP2019/069420
§ 371 (c)(1),
(2) Date: Feb. 5, 2021

(87) PCT Pub. No.: WO2020/030406
PCT Pub. Date: Feb. 13, 2020

(65) Prior Publication Data
US 2021/0268964 A1    Sep. 2, 2021

(30) Foreign Application Priority Data
Aug. 6, 2018 (DE) ............ 10 2018 119 024.7

(51) Int. Cl.
*B60R 1/00* (2022.01)
(52) U.S. Cl.
CPC ........ *B60R 1/001* (2013.01); *B60K 2370/176* (2019.05); *B60K 2370/21* (2019.05); *B60R 2300/10* (2013.01)

(58) Field of Classification Search
CPC . B60R 1/001; B60R 2300/10; B60K 2370/21; B60K 2370/176
See application file for complete search history.

(56) References Cited

U.S. PATENT DOCUMENTS

| 2014/0118551 A1* | 5/2014 | Ikeda ............... G06V 20/58 348/148 |
| 2014/0132770 A1 | 5/2014 | Lee et al. |

(Continued)

FOREIGN PATENT DOCUMENTS

| DE | 103 29 054 A1 | 1/2005 |
| DE | 10 2008 010 119 A1 | 11/2008 |

(Continued)

OTHER PUBLICATIONS

Russian-language Office Action issued in Russian Application No. 2021105155/11(011200) dated Apr. 2, 2021 with partial English translation (seven (7) pages).

(Continued)

*Primary Examiner* — James M Pontius
(74) *Attorney, Agent, or Firm* — Crowell & Moring LLP (57) ABSTRACT

A camera monitoring system for a side region of a vehicle, includes an image-capturing unit for simultaneously capturing image data relating to a first ground region and relating to a second ground region on at least one side of the vehicle, and an image-analyzing unit, which is designed to separate image data relating to the first ground region from image data relating to the second ground region so as to enable independent display.

9 Claims, 6 Drawing Sheets

(56) References Cited

U.S. PATENT DOCUMENTS

| | | | |
|---|---|---|---|
| 2015/0081188 A1 | 3/2015 | Kornhaas | |
| 2017/0015248 A1* | 1/2017 | Baur | B60R 1/06 |
| 2017/0124881 A1 | 5/2017 | Whitehead | |
| 2017/0217369 A1* | 8/2017 | Endo | B60R 21/00 |
| 2017/0274827 A1 | 9/2017 | Lewis et al. | |

FOREIGN PATENT DOCUMENTS

| | | |
|---|---|---|
| DE | 10 2013 218 812 A1 | 3/2015 |
| DE | 10 2014 006 153 A1 | 10/2015 |
| DE | 10 2015 007 673 A1 | 12/2016 |
| DE | 10 2017 010 956 A1 | 7/2018 |
| EP | 3 106 349 B1 | 5/2018 |
| JP | 20170-011702 A | 1/2017 |
| JP | 2017-215936 A | 12/2017 |

OTHER PUBLICATIONS

International Search Report (PCT/ISA/210) issued in PCT Application No. PCT/EP2019/069420 dated Sep. 19, 2019 with English translation (five (5) pages).
German-language Written Opinion (PCT/ISA/237) issued in PCT Application No. PCT/EP2019/069420 dated Sep. 19, 2019 (five (5) pages).
German-language Office Action issued in German Application No. 10 2018 119 024.7 dated Dec. 6, 2018 (6 pages).
International Preliminary Report on Patentability (PCT/IB/326 & PCT/IB/373) issued in PCT Application No. PCT/EP2019/069420 dated Feb. 18, 2021, Including English translation of document C2 (German-language Written Opinion (PCT/ISA/237), filed on Feb. 5, 2021) (eight (8) pages).
Japanese language Office Action issued in Japanese Application No. 2021-506531 dated Apr. 4, 2021, English Translation (eight (8) pages).

* cited by examiner

CAMERA MONITORING SYSTEM

BACKGROUND AND SUMMARY OF THE INVENTION

The present invention relates to a camera monitoring system and to a method of supporting a driver assistance system or autonomous driving and, in particular, to a camera arrangement for replacing the usual mirrors on commercial (utility) vehicles.

The continuous improvement of video sensor technology and visual display possibilities makes it possible to increasingly replace known devices of indirect visual representation in vehicles. Instead of traditional mirrors, camera monitoring or camera display systems are increasingly being used to replace the mirrors and provide higher visual quality, including additional functionality such as zooming or superimposed representations on displays. Another advantage of camera monitoring systems is that the cameras used are relatively small and therefore the drag is reduced. The otherwise used rear-view mirrors offer a considerable surface which is exposed to the wind attack due to their size and thus cause a significantly higher fuel consumption.

For example, well-known camera monitoring systems are described in US 2017/274827 A1 and in US 2014/132770 A1. The systems described there allow the replacement of mirrors by cameras, but vehicle-to-vehicle communication is used to obtain reliable detection of the rear environment, or mechanical joints are necessary to cover different regions (front region, rear region) at the same time. These systems cannot be used at all or only to a limited extent in the commercial vehicle sector, as there is usually no possibility of visual monitoring by the driver in commercial vehicles.

There is therefore a need for a camera monitoring system that provides a high degree of flexibility and reliability in environment capture in order to replace rear-view mirrors, especially in commercial vehicles.

At least part of these problems is solved by a camera monitoring system, a commercial vehicle equipped with such a system, and a method, in accordance with the claimed invention.

The present invention relates to a camera monitoring system for a side region of a vehicle, in particular a commercial vehicle. The camera monitoring system includes:
  an image capture unit for the simultaneous capture of image data for a first ground region and a second ground region on at least one side of the vehicle; and
  an image analysis unit that is designed to separate image data for the first ground region from image data for the second ground region to enable an independent display.

The camera monitoring system is in particular a camera display system suitable for replacing existing rear-view mirrors on a commercial vehicle. It is therefore designed for side image capture in order to visually capture a side and rear environment of the vehicle. It is understood that exemplary embodiments should not be restricted to use in specific vehicles such as utility vehicles. The camera monitoring system can be used on any vehicle.

The first ground region can be defined as follows: it starts with a first line, which extends perpendicularly to a direction of movement of the commercial vehicle and is offset rearwards by 4 m from a position of a driver (or his eye points), and extends to a distance of 26 m rearwards parallel to a vehicle side (driver side or passenger side) with a variable lateral width, wherein the variable width increases linearly rearwards from the first line from 1 m to a width of 5 m and then remains constant.

The second ground region can be defined as follows: it starts with a second line, which extends perpendicularly to a direction of movement of the commercial vehicle and is offset rearwards by 1.5 m from a position of a driver (or his eye points), and extends to a length of 23.5 m rearwards parallel to a vehicle side (driver side or passenger side) with a variable lateral width, wherein the variable width increases linearly from 4.5 m to a width of 15 m up to a distance of 8.5 m from the second line and then remains constant.

The first and second ground regions may extend from the vehicle on both sides, wherein the detection unit usually covers only one side. The terms "front" and "rear" refer to a normal direction of travel of the vehicle, i.e. "front" is in the direction of the normal forward movement of the vehicle.

Optionally, the image capture unit includes at least one of the following camera units:
  a first camera unit with a wide-angle lens or a fish-eye lens to simultaneously capture a front region in front of the commercial vehicle, the first ground region, the second ground region and a third ground region when attached to a front corner of the commercial vehicle on the passenger side;
  a second camera unit for the capture of image data on a passenger side of the commercial vehicle;
  a third camera unit for the capture of image data on a driver side of the commercial vehicle;
  a fourth camera unit with a wide-angle lens or a fish-eye lens for the simultaneously capture of the front region, the first ground region, the second ground region and a third ground region when attached to a front corner of the commercial vehicle on the driver side.

For example, the second camera unit and the third camera unit are designed to capture image data from a (rear) side region on a driver side or passenger side of the vehicle (for example the viewing range of a conventional rear-view mirror).

The third ground region can be defined as follows: it starts with a third line, which runs perpendicularly to a direction of movement of the commercial vehicle through a position of a driver (or his eye points) and extends 1.75 m rearwards and 1 m forwards at a width of 2 m parallel to a vehicle side (driver side or passenger side). The third ground region is therefore essentially next to the driver's cab of the exemplary commercial vehicle.

The front region can be defined as follows: it starts with a front vehicle boundary and extends in the longitudinal direction of the vehicle up to at least 2 m in front of the vehicle boundary. In addition, the front region can extend over the total width of the driver's cab and sideways by 2 m beyond the passenger side.

It is understood that the capture unit can at least capture the defined regions (the ground regions and the front region) but can also capture other regions. The defined regions should therefore represent minimum regions which are covered as a minimum.

The image processing unit may be designed to perform an image transformation of image data from the first camera unit and/or from the fourth camera unit to compensate for distortions due to the lens used. This results in redundancy, since the first camera unit (and also the fourth camera unit) also capture a rearward-facing side region of the vehicle, which is also captured by the second camera unit (and also by the third camera unit). The image transformations make the captured images comparable.

Optionally, the camera monitoring system includes at least one display unit with at least a first section for displaying the first ground region and a second section for displaying the second ground region. The third ground region and/or the front region can also be displayed in a separate section of the display unit. It is also possible that several display units are available. For example, there may be separate displays for the passenger side and the driver side for monitoring the sides of the vehicle independently.

Optionally, the image analysis unit is designed to verify (or recognize or identify) at least one of the following environment information items in the captured image data and to provide corresponding results:
a road marking;
an object (for example a tree, a sidewalk, a bicycle path, a pedestrian, etc.);
another vehicle;
a roadside.

This makes it possible, for example, to support lane tracking or a driver assistance system or autonomous driving. In particular, the first camera unit and/or the fourth camera unit can be used for this purpose, both of which can be aligned vertically downwards (to the road) for example and thus can clearly capture the mentioned environment information, even if further vehicles or other objects are in the vicinity and block a horizontal view.

The present invention also relates to a vehicle, in particular to a commercial vehicle, which has a previously described camera monitoring system.

The present invention also relates to a method for supporting a driver assistance system or the autonomous driving of a vehicle. The method includes the following steps:
evaluating image data captured by a previously described camera monitoring system;
based on this, detecting environment information of the vehicle, wherein the environment information includes at least one of the following: a captured road marking, a captured side of a road, a captured other vehicle, a captured object in the vicinity of the vehicle;
providing the environment information.

The provided environment information can be used in particular for lane tracking or orientation.

This method, or at least parts thereof, may also be implemented or stored in the form of instructions in software or on a computer program product, wherein stored instructions are able to perform the steps according to the method when the method is running on a processor. Therefore, the present invention also relates to computer program product with software code stored on it (software instructions), which is designed to perform one of the previously described methods when the software code is executed by a processing unit. The processing unit can be any form of computer or control unit that has a suitable microprocessor that can execute software code.

The exemplary embodiments of the present invention are better understood from the following detailed description and the enclosed drawings of the different exemplary embodiments, which should not be understood, however, in such a way that they limit the disclosure to the specific embodiments but serve only for explanation and understanding.

DETAILED DESCRIPTION OF THE DRAWINGS

Figure 1:
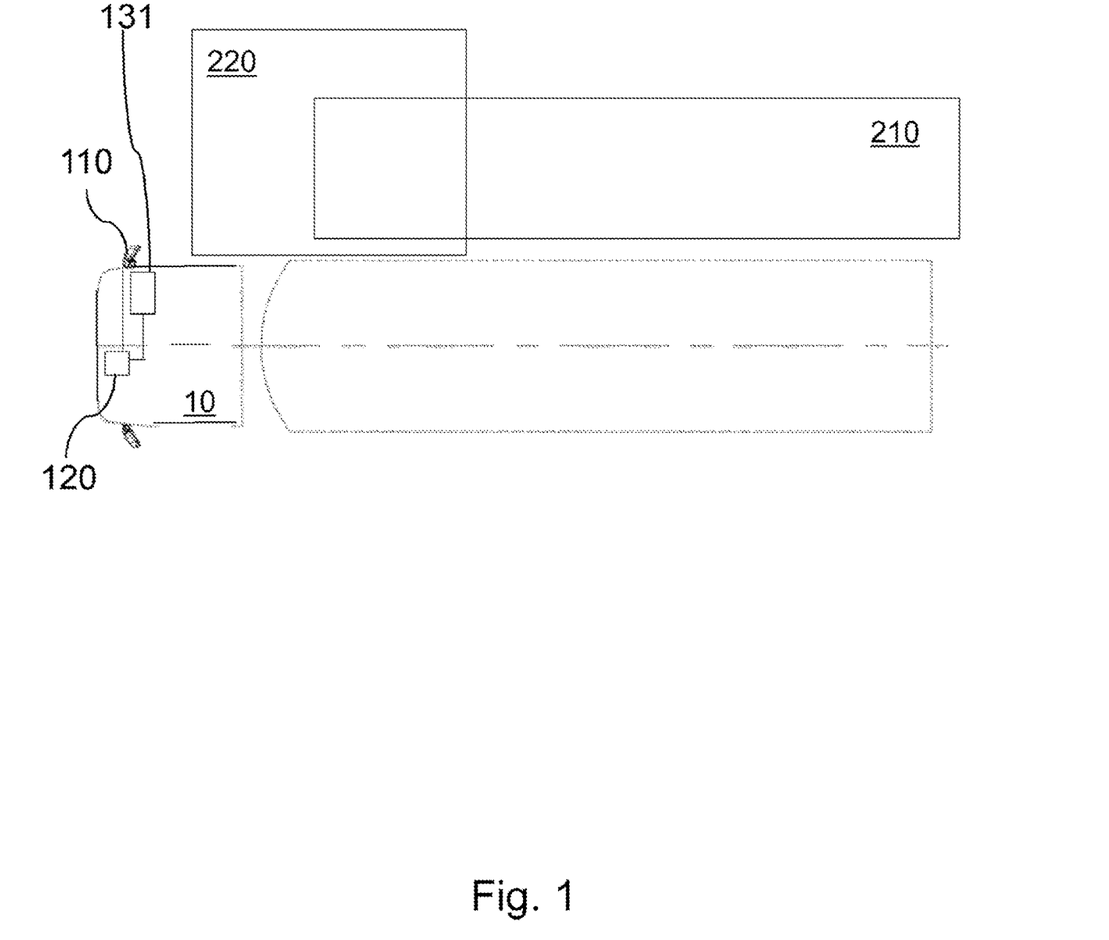
FIG. 1 shows a camera monitoring system according to an exemplary embodiment of the present invention.

FIG. 1 shows a camera monitoring system according to an exemplary embodiment of the present invention. It is particularly suitable for use in commercial vehicles, but also suitable for other vehicles, for example to replace existing mirror arrangements. The camera monitoring system comprises an image capture unit 110 for the simultaneous capture of image data for a first ground region 210 and for a second ground region 220 on at least one side (especially on the passenger side) of the exemplary commercial vehicle 10. The image capture unit 110 is, for example, a suitably mounted camera, which captures both ground regions 210, 220 simultaneously with one image. In addition, the camera monitoring system includes an image analysis unit 120, which is designed to separate image data for the first ground region 210 from image data for the second ground region 220 to enable an independent display.

Optionally, the camera monitoring system comprises at least one display unit 131 for visualizing the images captured by the image capture unit 110. However, the display unit 131 does not have to be part of the camera monitoring system. It is also possible to use an existing display for this purpose.

For example, it is possible to display the first ground region 210 in a first section of the display unit 131 and the second ground region 220 in another section. In the simplest example, the image capture unit 110 is a camera with a suitable lens (for example, a wide-angle lens), which can detect multiple regions simultaneously without having to move the camera. The multiple regions are separated by the image processing unit 120 to allow the separate, simultaneous display on the display unit 131. The ground regions 210, 220 can be displayed on the display but also one after the other by switching.

Figure 2:
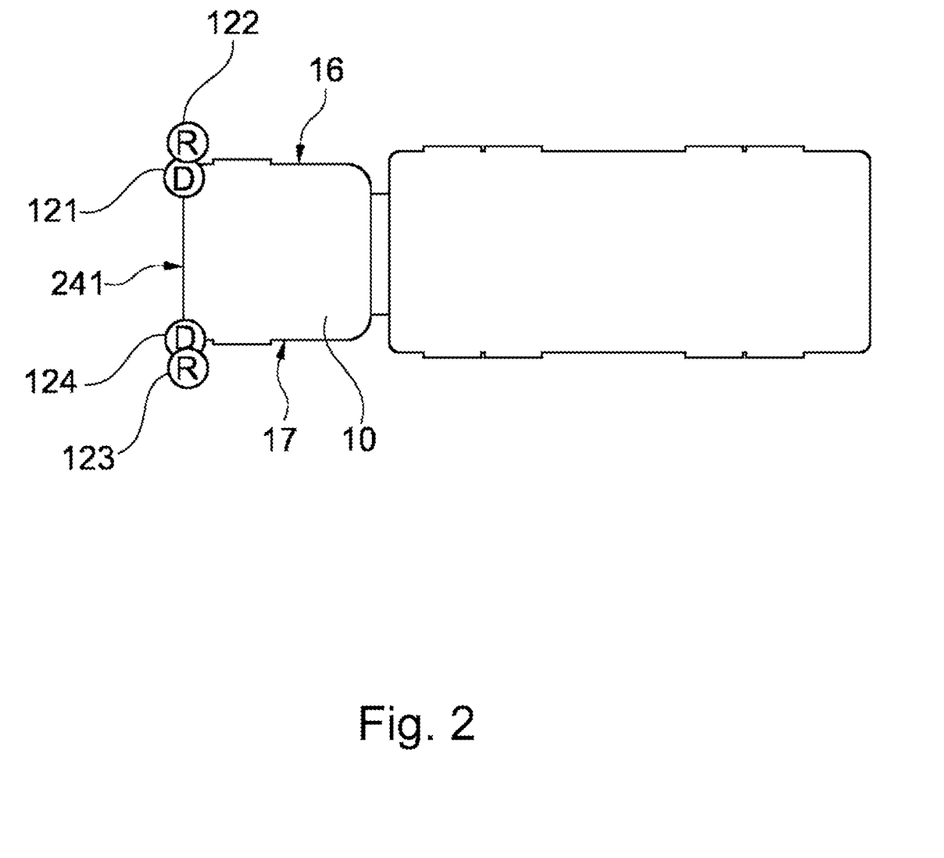
FIG. 2 shows further details of the camera monitoring system according to further exemplary embodiments.

FIG. 2 shows another exemplary embodiment of the camera monitoring system, which differs from the system shown in FIG. 1 in that the image capture unit 110 comprises a first camera unit 121, a second camera unit 122, a third camera unit 123 and a fourth camera unit 124, for example.

The first camera unit 121 and the second camera unit 122 are, for example, designed to be mounted in a front corner region or on a side region of the cab (for example on the passenger side 16) and to capture the side region and rear region of the commercial vehicle independently of each other. In particular, the first camera unit 121 also captures a ground region directly in front of and next to the commercial vehicle and the side region behind the driver's cab. To achieve this, the first camera unit 121 can include a suitable wide-angle lens such as a fish-eye lens. The second camera unit 122 captures a side and rear region (first and second ground regions 210, 220) of the exemplary commercial vehicle. For this purpose, a suitable wide-angle lens may be provided.

In addition, the third camera unit 123 and the fourth camera unit 124 are provided on the driver side 17, which can be attached in a corner region of the cab 10. The third camera unit 123 can be in a similar or identical form to the second camera unit 122 and can capture a side region next to or behind the driver's cab 10 on the driver side 17. The fourth camera unit 124 may be of a similar or identical form to the first camera unit 121 and can capture a ground region that is directly adjacent to the commercial vehicle. To achieve this, the fourth camera unit 124 can also include a suitable wide-angle lens such as a fish-eye lens.

This offers the advantage that different sensor regions and in particular ground regions around the vehicle are captured in parallel. For example, the first camera unit 121 and the second camera unit 122 can simultaneously capture the first and second ground regions 210, 220 on the side next to and behind the commercial vehicle. Due to this redundancy, exemplary embodiments are particularly suitable for commercial vehicles where visual checking by the driver is generally not possible on the passenger side.

Exemplary embodiments of the present invention are therefore particularly suitable for replacing ordinary mirror arrangements such as rear-view mirrors of commercial vehicles, wherein additional functionalities are provided.

FIG. 3A, FIG. 3B, FIG. 4A and FIG. 4B illustrate the ground regions which are captured simultaneously as side regions for example by the camera units 121, 122, 123, 124 according to exemplary embodiments. Here and below, all length specifications are understood to have a tolerance of up to ±10% or ±5%. In addition, the following ground regions are minimal regions, which are captured as a minimum. It is understood that the camera units will also capture other regions.

Figure 3A:
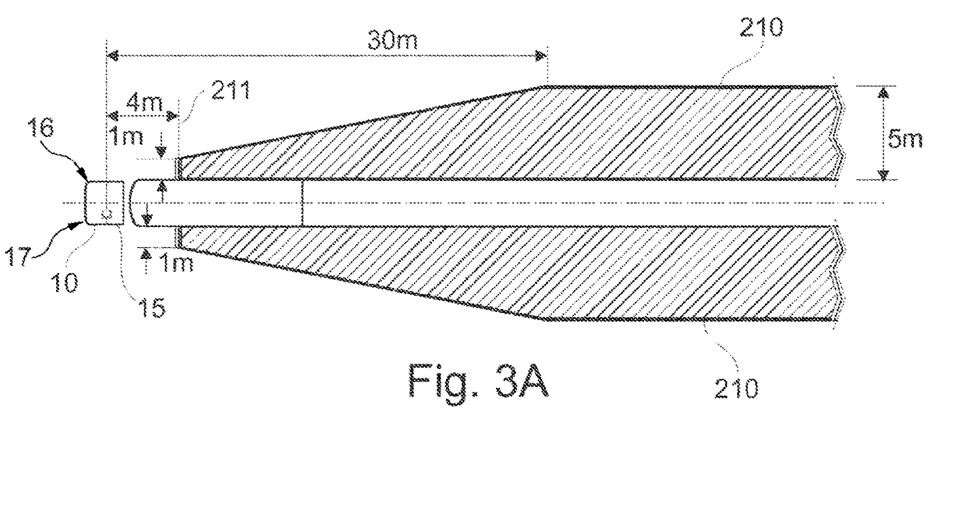
FIG. 3A,3B show ground regions which are captured by the capture unit simultaneously according to exemplary embodiments.
Figure 3B:
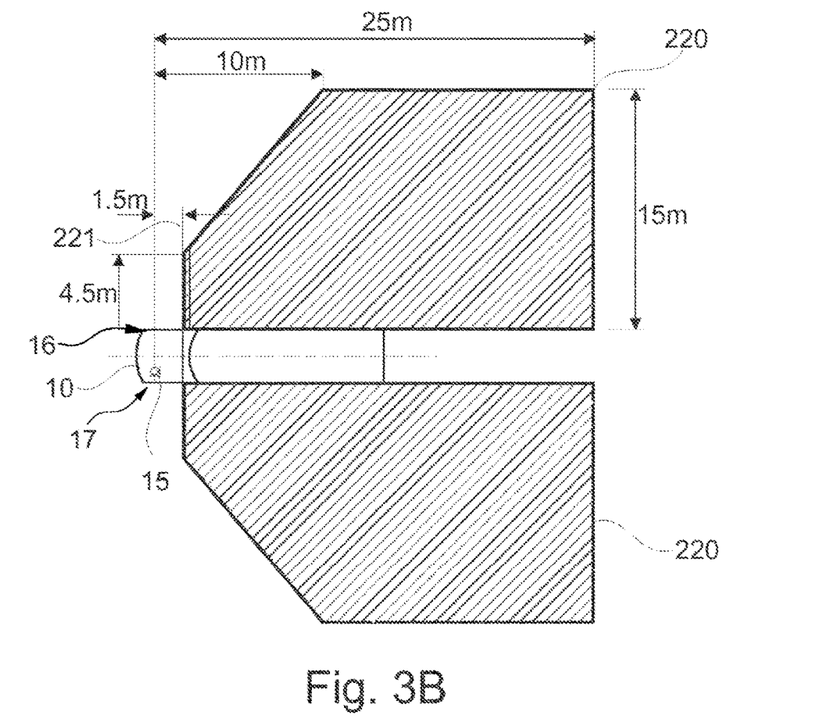

FIGS. 3A, 3B illustrate the first ground region 210 and the second ground region 220, which are captured simultaneously by the second and third camera units 122, 123 on their respective sides according to exemplary embodiments.

FIG. 3A shows the first ground region 210, which extends on both sides of the vehicle and can be defined as follows: it starts with a first line 211, which extends perpendicularly to a direction of movement of the commercial vehicle and is offset rearwards by 4 m from a position 15 of a driver (or his eye points) and extends rearwards parallel to both vehicle edges 16, 17 with a variable lateral width. The variable width increases linearly from 1 m to a width of 5 m rearwards up to a distance of 26 m from the first line 211 and then remains constant. The first ground region 210 thus has a maximum width of approx. 5 m, wherein this maximum width is reached at a distance of approx. 30 m starting at the driver's position.

FIG. 3B shows the second ground region 220, which extends on both sides of the vehicle and can be defined as follows: the second ground region 220 begins with a second line 221, which extends perpendicularly to a direction of movement of the commercial vehicle and is offset rearwards by 1.5 m from a position 15 of a driver (or his eye points) and extends rearwards parallel to the edges of the vehicle 16, 17 to a length of 23.5 m with a laterally variable width. The variable width increases linearly from 4.5 m to a width of 15 m up to a distance of 8.5 m from the second line 221 and then remains constant rearwards. It thus widens from approx. 4.5 m to a maximum width of 15 m, which is reached at a distance of approx. 10 m from the driver's position.

The first ground region 210 from FIG. 3A thus essentially represents a viewing region rearwards, while the second ground region 220 from FIG. 3B represents a side view region, which is important, for example, for a lane change in order to detect whether there is a vehicle in one of the adjacent lanes next to the vehicle, for example. The second camera unit 122 (and analogously the third camera unit 123 on the driver side 16) is primarily used for capturing the first ground region 210 and simultaneously the second ground region 220.

Figure 4A:
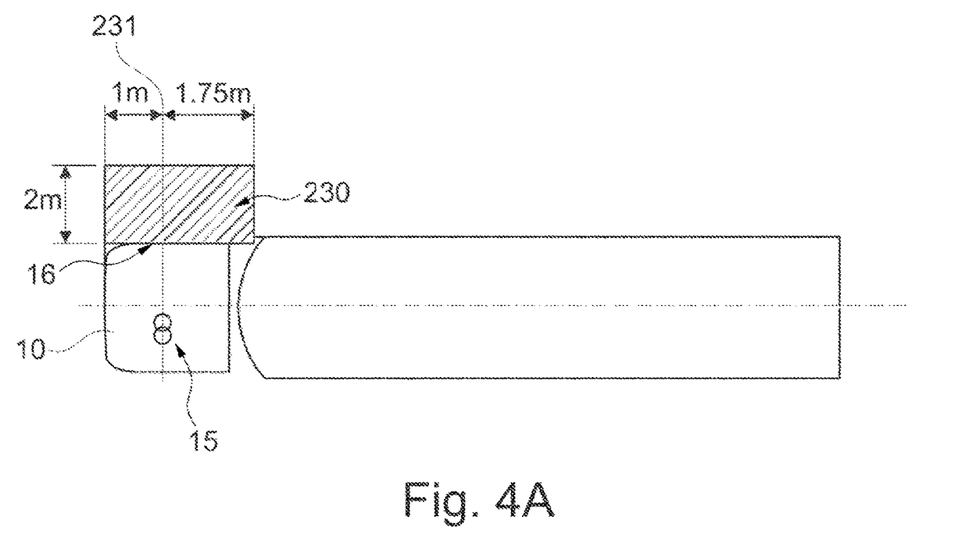
FIG. 4A,4B show further ground regions which are captured by the capture unit simultaneously according to exemplary embodiments.
Figure 4B:
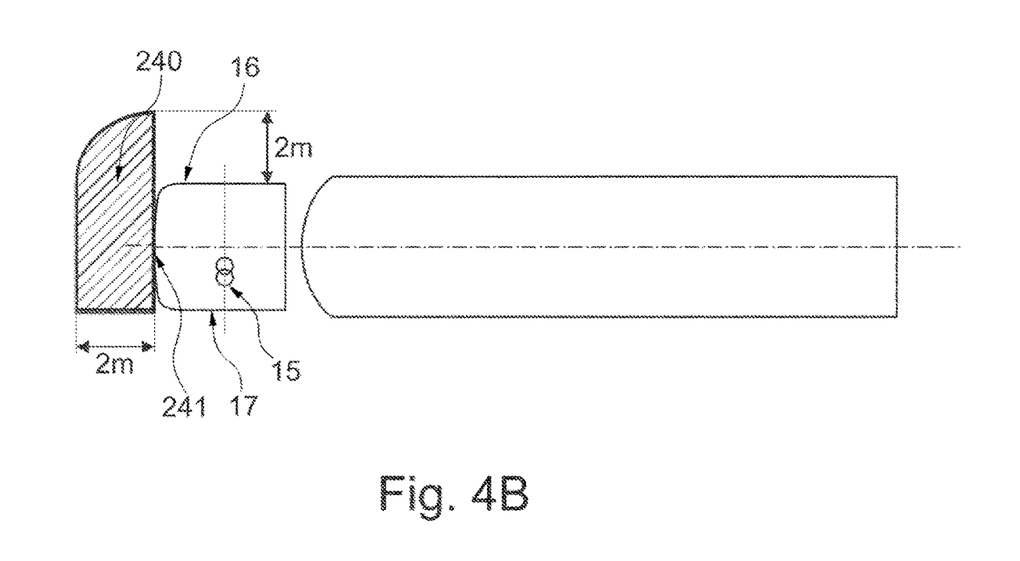

FIGS. 4A, 4B illustrate the third ground regions 230 and the front region 240, which according to exemplary embodiments are primarily captured simultaneously by the first camera unit 121 on the passenger side 16 (and analogously by the fourth camera unit 124 on the driver side 17).

FIG. 4A illustrates the third ground region 230, which extends from a third line 231, which runs perpendicularly to a direction of movement of the commercial vehicle rearwards by 1.75 m and approx. 1 m forwards through the position 15 of the driver. The width of the third ground region 230 is about 2 m, measured from the right edge of the vehicle 16. The third ground region 230 is defined for the driver side 17 in the same or a similar way.

FIG. 4B shows a fourth ground region 240 (front region), which is also captured by the first camera unit 121, for example. The fourth ground region 240 extends from the front 241 of the cab 10 over the width of the vehicle up to a distance of approx. 2 m forwards and up to 2 m beyond the vehicle edge 16 on the passenger side. Optionally, the fourth ground region 240 is rounded at the front right corner (from the driver's point of view) with a radius of curvature of approx. 2 m. The third ground region 230 and the fourth ground region 240 therefore cover in particular regions which are visible with difficulty or not visible at all to drivers of commercial vehicles (as opposed to passenger cars).

For example, in order to achieve redundancy of the camera monitoring system, the first camera unit 121 is mounted in an upper corner region of the cab 10 on the passenger side 16, so that the first camera unit 121 can capture the third ground region 230, the fourth ground region 240, the first ground region 210 and the second ground region 220. In order to be able to visually represent all ground regions as close to reality as possible, for example, images by the first camera unit 121 (for example with the fish-eye lens) from the first ground region 210 and from the second ground region 220 can be processed or transformed accordingly, in order to eliminate possible distortions by the fish-eye lens of the first camera unit 121.

Also on the driver side, the fourth camera unit 124 is advantageously a wide-angle or fish-eye camera, which also captures image data, which are suitable after corresponding transformation to capture the first and second ground regions 210, 220 and to visualize these to the driver with minimal distortion. For this purpose, the fourth camera unit 124 can again be mounted in an upper corner region of the cab 10 of the commercial vehicle, so that this camera unit can detect not only the third ground region 230 and the fourth ground region 240 (in front of the cab), but also the rear-facing first ground region 210 and the second ground region 220.

The distortion correction can also be done using lookup tables to adjust the image for a special display that is already present in the vehicle.

Exemplary examples thus allow the driver to constantly monitor what is happening both on the left side of the vehicle and on the right side of the vehicle. For example, camera units with a high resolution and a wide-angle lens can be used to ensure good coverage by the camera units. Compared to conventional mirror arrangements, such camera systems offer a very high degree of flexibility, since camera images can be displayed separately on different sections of a display. For example, it is possible to split a display to show the different ground regions separately.

Figure 5A:
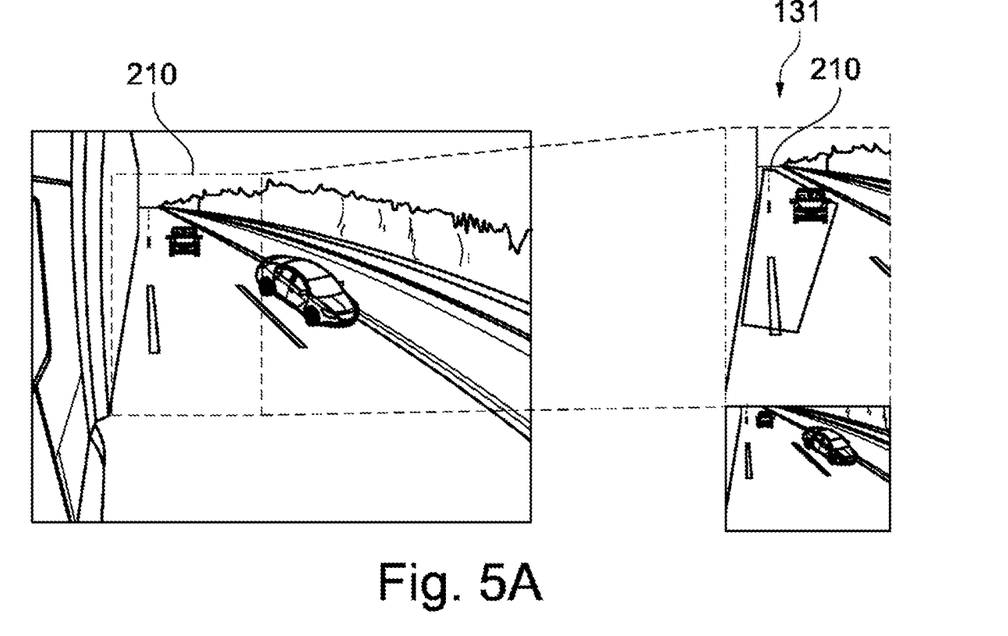
FIG. 5A,5B show a display for ground regions from FIGS. 3A, 3B.
Figure 5B:
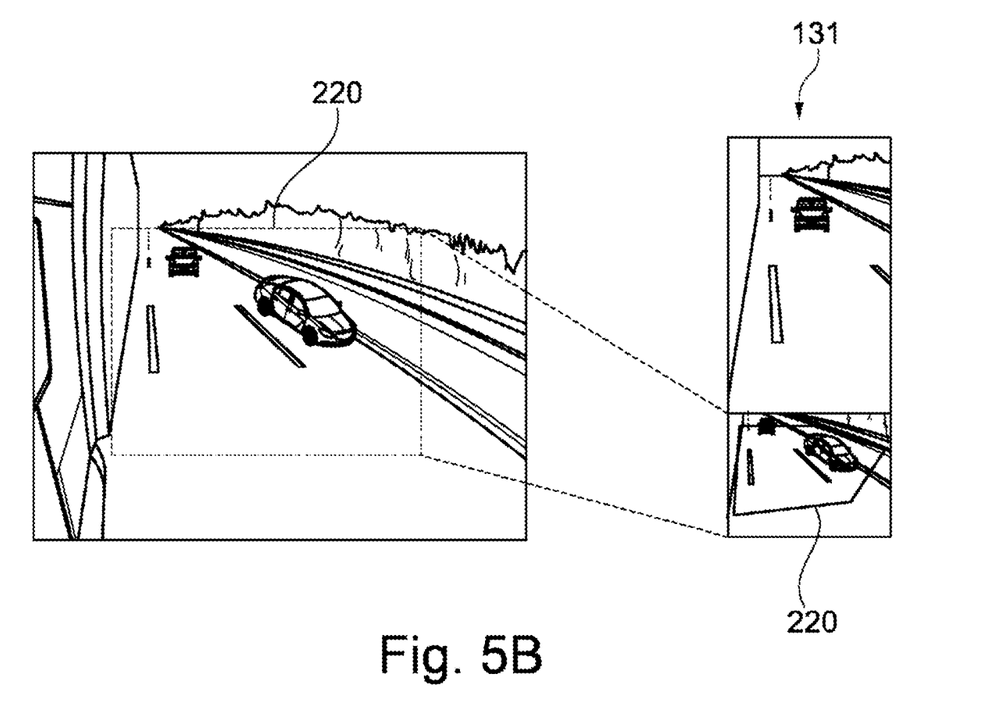

FIG. 5A and FIG. 5B show by way of example how a captured image from the driver side (on the left) can be displayed on the corresponding display unit 131. In FIG. 5A, the first ground region 210 is highlighted, which is shown in an upper region of the display unit 131, for example. FIG. 5B shows the second ground region 220, which is shown on the display unit 131 in a lower region, for example.

Figure 6A:
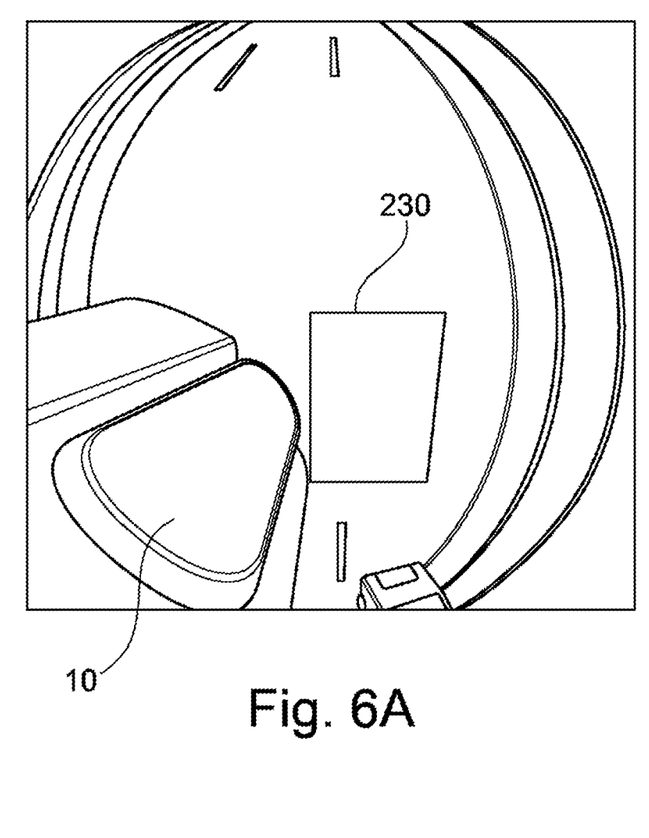
FIG. 6A,6B show an exemplary display for ground regions from FIGS. 4A, 4B.
Figure 6B:
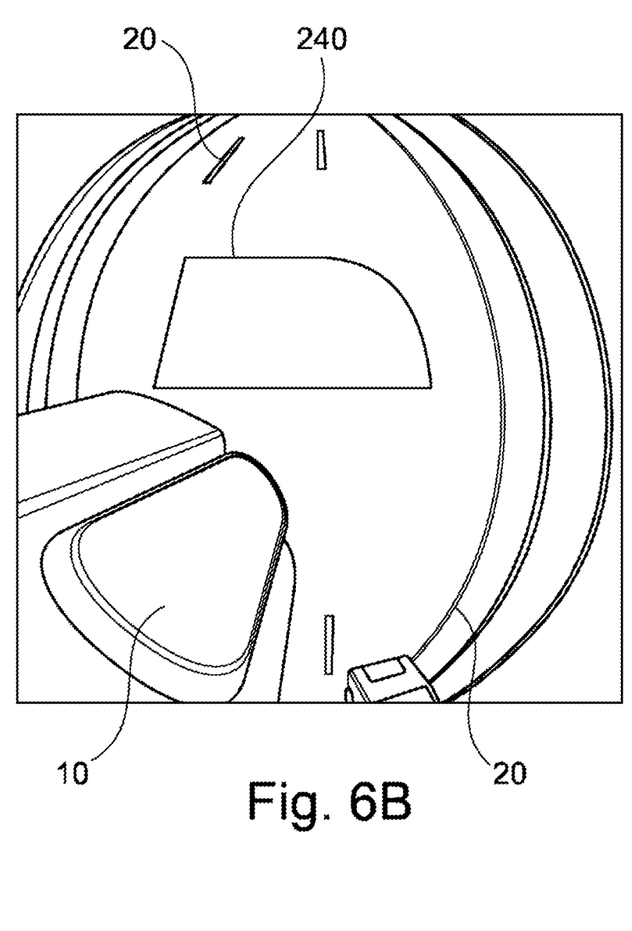

FIG. 6A shows by way of example a captured image of the third ground region 230 as it is captured by the first camera unit 121 on the passenger side 16. FIG. 6B shows by way of example the front region 240 as it is captured by the first camera unit 121 from the passenger side 16, for example. Both captured regions 230, 240 can be displayed in a similar way to the first ground region 210 and the second ground region 220 (see FIGS. 5A, 5B).

The first camera unit 121 (and similarly the fourth camera unit 124) comprises by way of example a fish-eye lens and is arranged in a corner region of the vehicle cabin, for example on the passenger side 16. In this way, both the third ground region 230 and the front region 240 can be captured. The first and third camera units 121, 124 are directed vertically downwards and can also capture regions in the horizontal (i.e. the first and second ground regions 210, 220) due to the fish-eye lens. It is advantageous if these fish-eye cameras 121, 124 have the highest possible resolution, in order to be able to recognize many details after distortion correction (image transformation) of the captured images. Therefore, the first camera unit 121 and/or the fourth camera unit 124 may have a higher resolution than the second camera unit 122 and/or the third camera unit 123, for example.

The road markings 20 shown (see for example FIG. 6B) can be captured or detected by any of the mentioned camera units 121, 122, 123, 124. Due to the defined ground regions, the road markings 20 or other objects can almost always be captured by the camera monitoring system. In contrast to conventional systems, which are directed forwards or directly rearwards, in exemplary embodiments of the present invention the view cannot be blocked by other objects (such as vehicles). In particular, the fish-eye cameras (first or fourth camera unit 121, 124) are suitable for detecting the road markings 20 and/or objects in an environment of the vehicle since they capture the ground region on all sides. However, the road markings 20 or other structures on the road near the vehicle can be captured and continuously tracked using the rear-facing second and/or third camera units 122, 123.

Therefore, exemplary embodiments can also be used in a driver assistance system or in autonomous driving, in order to take over the detection of road markings 20 or of objects in the environment of the vehicle by means of additional algorithms.

Exemplary embodiments of the present invention relate in particular to the following subject matter.

A camera monitoring system for a commercial vehicle which comprises at least one rear-facing wide-angle camera 122, 123, which covers the first ground region 210 and the second ground region 220.

According to other advantageous embodiments, the camera monitoring system comprises at least two rear-facing wide-angle cameras 122, 123, which can be mounted on the right and left sides of the vehicle.

According to other advantageous embodiments, the camera monitoring system comprises at least one downward-facing fish-eye camera 121, which can be mounted on the passenger side 16 to capture a front region 240 and a third ground region 230.

According to other advantageous embodiments, the camera monitoring system comprises an additional downward-facing fish-eye camera 124 on the driver side 17 of the cab 10 to provide further similar functionalities as provided on the passenger side 16. Thus, the first ground region 210 and the second ground region 220 can also be captured on the driver side 17.

According to other advantageous embodiments, the images which are captured by the camera monitoring system, for example by the rear-facing wide-angle cameras 122, 123, can be used for the detection of road markings 20 and/or for object detections.

According to other advantageous embodiments, the downward-facing fish-eye camera 121, 124 can be used to recognize the road markings 20 and/or to detect objects.

Exemplary embodiments thus also include a method for the use of the camera monitoring system. This method or these steps of the method can also be computer-implemented, i.e. can be implemented by instructions stored on a memory medium that are able to perform the steps of the method when it is running on a processor. The instructions typically include one or more statements, which may be stored in different ways on different media which are in or peripheral to a control unit (with a processor) which, when read and executed by the control unit, cause the control unit to perform functions, functionalities, and operations necessary to perform a method according to the present invention.

The features of the invention disclosed in the description, the claims and the figures may be essential for the realization of the invention both individually and in any combination.

REFERENCE CHARACTER LIST

10 Cab
15 Driver position (eye positions)
16 Passenger side (vehicle side on passenger side)
17 Driver side
20 Road markings
110 Image capture unit(s)
120 Image processing unit
121,122, . . . Camera units
131 Display unit(s)
210,220, . . . Ground region
211,121, . . . Front reference lines (first line, second line, . . . )
241 Front vehicle edge/vehicle boundary.

What is claimed is:

1. A camera monitoring system for a side region of a vehicle, comprising:
   an image capture unit for simultaneous capture of image data for a first ground region and for a second ground region on at least one side of the vehicle, wherein the image capture unit includes camera unit with a wide-angle lens configured to simultaneously capture an image of the first ground region and the second ground region; and
   an image analysis unit configured to separate, in the captured image, image data for the first ground region from image data for the second ground region to enable an independent display,
   wherein
   the first ground region is defined as follows:
      starting with a first line which extends perpendicularly to a direction of movement of the vehicle and is offset rearwards by 4 m from a position of a driver, the first ground region extends rearwards parallel to a vehicle edge with a laterally variable width, wherein the variable width increases linearly from 1 m to a width of 5 m to a distance of 26 m from the first line and then remains constant; and the second ground region is defined as follows:
starting with a second line, which extends perpendicularly to a direction of movement of the vehicle and which is offset rearwards by 1.5 m from a position of a driver, the second ground region extends rearwards parallel to a vehicle edge to a length of 23.5 m with a laterally variable width, wherein the variable width increases linearly from 4.5 m to a width of 15 m up to a distance of 8.5 m from the second line and then remains constant.

2. The camera monitoring system as claimed in claim 1, wherein
the image capture unit comprises at least one of the following camera units:
a first camera unit with a fish-eye lens to simultaneously detect a front region in front of the vehicle, the first ground region, the second ground region and a third ground region when attached to a front corner of the vehicle on the passenger side;
a second camera unit for capturing image data on a passenger side of the vehicle;
a third camera unit for capturing image data on a driver side of the vehicle;
a fourth camera unit with a fish-eye lens for simultaneously capturing the front region, the first ground region, the second ground region and a third ground region when attached to a front corner of the vehicle on the driver side.

3. The camera monitoring system as claimed in claim 2, wherein
the image analysis unit is configured to compensate for distortions in the captured image data.

4. The camera monitoring system as claimed in claim 2, wherein
the third ground region is defined as follows:
starting with a third line which extends perpendicularly to a direction of movement of the vehicle through a position of a driver, the third ground region extends parallel to a vehicle edge rearwards by 1.75 m and forwards by 1 m at a width of 2 m; and
the front region is defined as follows:
starting with a front vehicle boundary, the front region extends in the longitudinal direction of the vehicle up to at least 2 m over the entire width of the cab and sideways 2 m beyond the passenger side.

5. The camera monitoring system as claimed in claim 1, further comprising:
at least one display unit with at least a first section for displaying the first ground region and a second section for displaying the second ground region.

6. The camera monitoring system as claimed in claim 1, wherein
the image analysis unit is configured to verify and provide at least one of the following environment information items in the captured image data:
a road marking;
an object;
another vehicle;
a roadside.

7. A commercial vehicle comprising a camera monitoring system according to claim 1.

8. A method for supporting a driver assistance system or autonomous driving of a vehicle, the method comprising:
analyzing image data collected by a camera monitoring system, the camera monitoring system being for a side region of a vehicle and having:
an image capture unit for simultaneous capture of image data for a first ground region and for a second ground region on at least one side of the vehicle, wherein the image capture unit includes camera unit with a wide-angle lens configured to simultaneously capture an image of the first ground region and the second ground region; and
an image analysis unit configured to separate, in the captured image, image data for the first ground region from image data for the second ground region to enable an independent display based on the collected image data, identifying environment information of the vehicle;
based on the collected image data, identifying environment information of the vehicle, wherein the environment information includes at least one of the following:
a detected road marking, a detected roadside, a detected other vehicle, a detected object in the vicinity of the vehicle; and
providing the environment information,
wherein
the first ground region is defined as follows:
starting with a first line which extends perpendicularly to a direction of movement of the vehicle and is offset rearwards by 4 m from a position of a driver, the first ground region extends rearwards parallel to a vehicle edge with a laterally variable width, wherein the variable width increases linearly from 1 m to a width of 5 m to a distance of 26 m from the first line and then remains constant; and
the second ground region is defined as follows:
starting with a second line, which extends perpendicularly to a direction of movement of the vehicle and which is offset rearwards by 1.5 m from a position of a driver, the second ground region extends rearwards parallel to a vehicle edge to a length of 23.5 m with a laterally variable width, wherein the variable width increases linearly from 4.5 m to a width of 15 m up to a distance of 8.5 m from the second line and then remains constant.

9. A computer product comprising a non-transitory computer readable medium having stored therein a program code which, when executed on a processor, carries out the acts of:
analyzing image data collected by a camera monitoring system, the camera monitoring system being for a side region of a vehicle and having:
an image capture unit for simultaneous capture of image data for a first ground region and for a second ground region on at least one side of the vehicle, wherein the image capture unit includes camera unit with a wide-angle lens configured to simultaneously capture an image of the first ground region and the second ground region; and
an image analysis unit configured to separate, in the captured image, image data for the first ground region from image data for the second ground region to enable an independent display based on the collected image data, identifying environment information of the vehicle;

based on the collected image data, identifying environment information of the vehicle, wherein the environment information includes at least one of the following: a detected road marking, a detected roadside, a detected other vehicle, a detected object in the vicinity of the vehicle; and providing the environment information, wherein the first ground region is defined as follows:

starting with a first line which extends perpendicularly to a direction of movement of the vehicle and is offset rearwards by 4 m from a position of a driver, the first ground region extends rearwards parallel to a vehicle edge with a laterally variable width, wherein the variable width increases linearly from 1 m to a width of 5 m to a distance of 26 m from the first line and then remains constant; and the second ground region is defined as follows:

starting with a second line, which extends perpendicularly to a direction of movement of the vehicle and which is offset rearwards by 1.5 m from a position of a driver, the second ground region extends rearwards parallel to a vehicle edge to a length of 23.5 m with a laterally variable width, wherein the variable width increases linearly from 4.5 m to a width of 15 m up to a distance of 8.5 m from the second line and then remains constant.

* * * * *